United States Patent
Wang

(10) Patent No.: US 8,378,626 B2
(45) Date of Patent: Feb. 19, 2013

(54) MANAGEMENT DEVICE FOR CHARGING CIRCUIT AND WIRELESS TERMINAL

(75) Inventor: Jihong Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/580,151

(22) PCT Filed: Dec. 28, 2010

(86) PCT No.: PCT/CN2010/080385
§ 371 (c)(1), (2), (4) Date: Aug. 21, 2012

(87) PCT Pub. No.: WO2012/009935
PCT Pub. Date: Jan. 26, 2012

(65) Prior Publication Data
US 2012/0319643 A1     Dec. 20, 2012

(30) Foreign Application Priority Data
Jul. 23, 2010   (CN) .......................... 2010 1 0239150

(51) Int. Cl.
*H02J 7/00* (2006.01)
*G05F 3/16* (2006.01)
*H02H 7/00* (2006.01)
*H01Q 11/12* (2006.01)

(52) U.S. Cl. ........ 320/107; 320/108; 320/109; 320/139; 320/140; 320/149; 323/225; 323/263; 323/274; 323/283; 455/571; 455/572; 455/573; 455/127.1; 713/320; 361/18

(58) Field of Classification Search .................... 320/107
See application file for complete search history.

(56) References Cited

U.S. PATENT DOCUMENTS
5,701,068 A * 12/1997 Baer et al. ...................... 320/119
6,239,509 B1 * 5/2001 Rader et al. ..................... 307/11
(Continued)

FOREIGN PATENT DOCUMENTS
| | | |
|---|---|---|
| CN | 101154821 A | 4/2008 |
| CN | 101902043 A | 12/2010 |
| TW | 200937161 A | 9/2009 |

OTHER PUBLICATIONS
International Search Report in international application No. PCT/CN2010/080385, mailed on May 5, 2011.
(Continued)

*Primary Examiner* — Yalkew Fantu
(74) *Attorney, Agent, or Firm* — Oppedahl Patent Law Firm LLC

(57) ABSTRACT

The present disclosure provides a management device for a charging circuit and a wireless terminal, which belong to the technical field of management control of a linear charging circuit. The device includes a power supply management module (5), a buck switching voltage converter (1) and a linear charging circuit (2). The power supply management module (5) includes an adjustable Low Dropout (LDO) linear regulator (6) and an Analog-to-Digital Converter (ADC) (4), wherein the output terminal of the adjustable LDO linear regulator (6) is connected with the feedback terminal of the buck switching voltage converter (1) through a first preset resistor (R62). The input terminal of the ADC (4) is connected with the anode of a battery (3). The control terminal of the power supply management module (5) is connected with the control terminal of the linear charging circuit (2). The output terminal of the buck switching voltage converter (1) is connected with the input terminal of the linear charging circuit (2). The output terminal of the linear charging circuit (2) is connected with the anode of the battery (3). With the device, the energy loss can be reduced and the whole power loss can be reduced.

6 Claims, 4 Drawing Sheets

U.S. PATENT DOCUMENTS

| | | | |
|---|---|---|---|
| 6,259,234 B1 * | 7/2001 | Perol | 323/222 |
| 6,348,744 B1 * | 2/2002 | Levesque | 307/86 |
| 7,064,531 B1 * | 6/2006 | Zinn | 323/268 |
| 7,145,316 B1 * | 12/2006 | Galinski, III | 323/288 |
| 7,550,954 B2 | 6/2009 | De Nisi et al. | |
| 7,728,550 B2 | 6/2010 | Carr et al. | |
| 2002/0093318 A1 * | 7/2002 | Wallis | 323/274 |
| 2005/0040800 A1 * | 2/2005 | Sutardja | 323/283 |
| 2007/0252564 A1 * | 11/2007 | De Nisi et al. | 323/268 |
| 2009/0021228 A1 | 1/2009 | Carr et al. | |
| 2009/0153108 A1 | 6/2009 | Hendin | |

OTHER PUBLICATIONS

English Translation of the Written Opinion of the International Search Authority in international application No. PCT/CN2010/080385, mailed on May 5, 2011.

* cited by examiner

MANAGEMENT DEVICE FOR CHARGING CIRCUIT AND WIRELESS TERMINAL

TECHNICAL FIELD

The present disclosure relates to the technical field of management control of a linear charging circuit, and more particularly, to a management device for a charging circuit and a wireless terminal.

BACKGROUND

As functions of electronic products become more and more complicated while electronic products are becoming smaller and portable, especially with extensive use of wireless communication terminals, higher requirements are put forward for designers, for example, lower power consumption, small amount of the whole dissipated heat, and higher reliability are required. Actually, smaller products will badly impede heat dissipation, which results in poor heat dissipation to reduce the reliability of the products. Therefore, the whole power of an electronic product can be reduced to effectively reduce the whole dissipated heat, and increase the reliability.

Generally, a portable wireless terminal product is provided with a charging function. Therefore, it is of great significance to study linear charging circuits in increasing the charging efficiency. Currently, to solve the problem above, a first existing technique discloses the following technical solution: a dynamic feedback control circuit is added in a charger to increase the transient load variation by regulating the output voltage, so that the output voltage of the charger is close to the voltage of the battery and the power consumption is reduced. A second existing technique discloses the following technical solution: a TL494 (pulse-width modulation control circuit) pulse-width modulation component which controls the output voltage and current is applied, and improved constant-current charging is utilized; in the initial stage, the current is large and the voltage is low, and then the current is reduced gradually and the voltage is increased gradually to avoid over-charging. It can be seen from the first and second existing techniques that both solutions increase the charging efficiency by regulating the charging voltage and the charging current of the charger.

Currently, since Universal Serial Bus (USB) interfaces, which have excellent data transmission capability and capability of power supply for the peripheral equipment, are convenient to use and applied broadly, the USB interfaces are used as charging interfaces by more and more electronic products with charging function, so that data interfaces and charging interfaces are unified. Linear charging circuits are used by all portable wireless communication terminals, such as mobile phones etc, which can be generally charged by adapters or USB interfaces of PCs. If a high-efficiency charging device is mounted on an electronic product, the charging efficiency will be increased no matter the electronic product is charged by an adapter or a USB interface of a PC. The voltage is low at low battery power, and the voltage of the battery will be increased with the increase of the battery power. During the charging process, there is a changing voltage difference between the input voltage and the voltage of the battery, which mainly acts on a charging tube, thus causing unnecessary energy loss which is more serious especially when the charging current is relatively large.

SUMMARY

The present disclosure provides a management device for a charging circuit and a wireless terminal, to solve the problem that the energy loss is too large and the charging efficiency is low during the charging process in the prior art.

To solve the problem above, the present disclosure provides a management device for a charging circuit and a wireless terminal, and the technical solution is as follows.

A management device for a charging circuit, including: a power supply management module, a buck switching voltage converter and a linear charging circuit; the power supply management module includes an adjustable Low Dropout (LDO) linear regulator and an Analog-to-Digital Converter (ADC); wherein, an output terminal of the adjustable LDO linear regulator is connected with a feedback terminal of the buck switching voltage converter through a first preset resistor; an input terminal of the ADC is connected with an anode of a battery; a control terminal of the power supply management module is connected with a control terminal of the linear charging circuit; an output terminal of the buck switching voltage converter is connected with an input terminal of the linear charging circuit; and an output terminal of the linear charging circuit is connected with the anode of the battery.

Further, when the battery is charged, the ADC of the power supply management module may be configured to sample battery power, and, when determining that the battery is effective and that the battery power is not full, feed back an output voltage of the adjustable LDO linear regulator to the buck switching voltage converter according to a voltage of the battery; the buck switching voltage converter may be configured to output a voltage to the linear charging circuit according to the feedback result; and the linear charging circuit may be configured to charge the battery under the control of the power supply management module.

Further, a relation between the output voltage Vvdc_out of the buck switching voltage converter and the output voltage Vldo_ctrl of the adjustable LDO linear regulator may be:

(Vvdc_out−Vfb)/V3+(Vldo_ctrl−Vfb)/V1=Vfb/V2, where Vfb is a voltage of the feedback terminal of the buck switching voltage converter, V1 is a resistance value of the first preset resistor, V2 is a resistance value of a second preset resistor, and V3 is a resistance value of a third preset resistor.

A wireless terminal includes: a charging circuit management device, wherein, the charging circuit management device includes a power supply management module, a buck switching voltage converter and a linear charging circuit; wherein, the power supply management module includes an adjustable Low Dropout (LDO) linear regulator and an Analog-to-Digital Converter (ADC); wherein, an output terminal of the adjustable LDO linear regulator is connected with a feedback terminal of the buck switching voltage converter through a preset resistor; an input terminal of the ADC is connected with an anode of a battery; a control terminal of the power supply management module is connected with a control terminal of the linear charging circuit; an output terminal of the buck switching voltage converter is connected with an input terminal of the linear charging circuit; and an output terminal of the linear charging circuit is connected with the anode of the battery.

Further, when the battery is charged, the ADC of the power supply management module may be configured to sample battery power, and, when determining that the battery is effective and that the battery power is not full, feed back an output voltage of the adjustable LDO linear regulator to the buck switching voltage converter according to a voltage of the battery; the buck switching voltage converter may be configured to output a voltage to the linear charging circuit according to the feedback result; and the linear charging circuit may be configured to charge the battery under the control of the power supply management module.

Further, a relation between the output voltage Vvdc_out of the buck switching voltage converter and the output voltage Vldo_ctrl of the adjustable LDO linear regulator may be:

(Vvdc_out−Vfb)/V3+(Vldo_ctrl−Vfb)/V1=Vfb/V2, where Vfb is a voltage of the feedback terminal of the buck switching voltage converter, V1 is a resistance value of a first preset resistor, V2 is a resistance value of a second preset resistor, and V3 is a resistance value of a third preset resistor.

The present disclosure can realize automatic adjustment of the charging voltage by adding a buck switching voltage converter and utilizing an adjustable LDO linear regulator in a power supply management module, thus reducing the voltage drop on the charging tube (i.e. reducing the energy loss), the whole power loss is reduced to improve the whole heat dissipation well.

DETAILED DESCRIPTION

To make the technical problem to be solved by the present disclosure, technical solutions and beneficial effects of the present disclosure clearer, the present disclosure will be further described hereinbelow in detail with reference to the accompanying drawings and embodiments. It should be understood that, the embodiments described herein are only intended to illustrate the present disclosure but not to limit the present disclosure.

Figure 1:
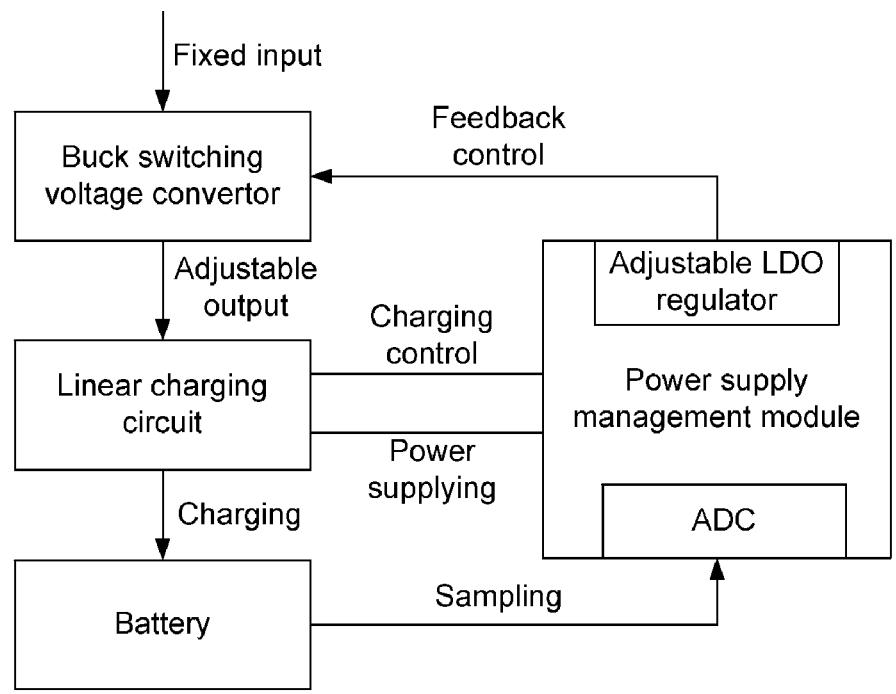
FIG. 1 is a diagram illustrating the structure of a management device for a charging circuit provided by the present disclosure.

Embodiment 1 of the present disclosure provides a management device for a charging circuit. As shown in FIG. 1, the management device for a charging circuit includes: a power supply management module, a buck switching voltage converter and a linear charging circuit. The power supply management module includes an adjustable LDO linear regulator and an ADC, wherein the output terminal of the adjustable LDO linear regulator of the power supply management module is connected with the feedback terminal of the buck switching voltage converter through a preset resistor. The input terminal of the ADC of the power supply management module is connected with the anode of a battery. The control terminal of the power supply management module is connected with the control terminal of the linear charging circuit. The output terminal of the buck switching voltage converter is connected with the input terminal of the linear charging circuit. The output terminal of the linear charging circuit is connected with the anode of the battery.

When the battery is charged, the ADC of the power supply management module is configured to sample the battery power, and, when determining that the battery is effective and that the battery power is not full, feed back the output voltage of the adjustable LDO linear regulator to the buck switching voltage converter according to the voltage of the battery. The buck switching voltage converter is configured to output a voltage to the linear charging circuit according to the feedback result. The linear charging circuit is configured to charge the battery under the control of the power supply management module;

wherein the relation between the output voltage Vvdc_out of the buck switching voltage converter and the output voltage Vldo_ctrl of the adjustable LDO linear regulator is:

(Vvdc_out−Vfb)/V3+(Vldo_ctrl−Vfb)/V1=Vfb/V2, where Vfb is the voltage of the feedback terminal of the buck switching voltage converter, V1 is the resistance value of a first preset resistor, V2 is the resistance value of a second preset resistor and V3 is the resistance value of a third preset resistor.

Figure 2:
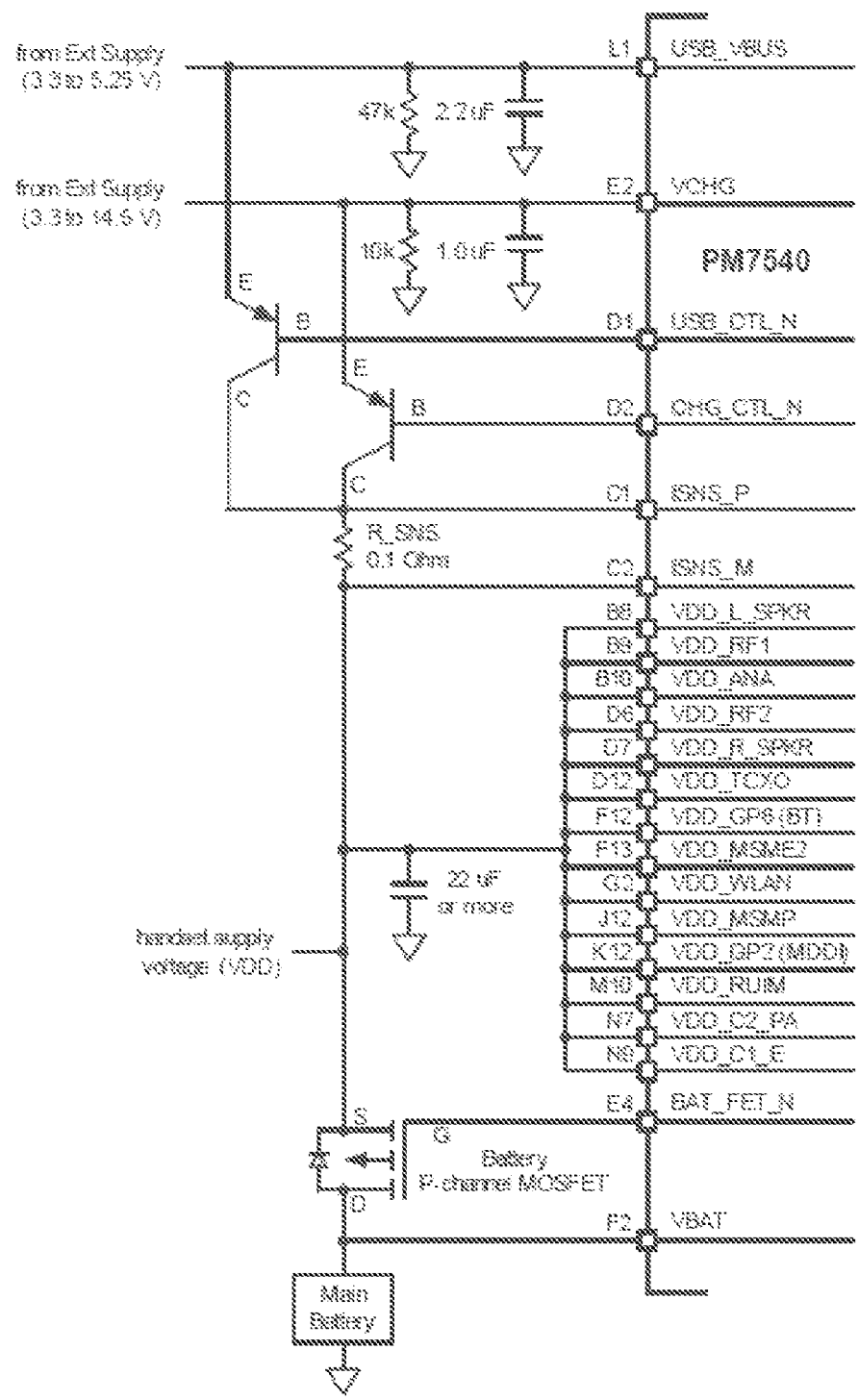
FIG. 2 is a schematic diagram illustrating the principle of a linear charging circuit provided by the present disclosure.

A control method for automatically adjusting a charging voltage of the present disclosure is described hereinbelow with reference to the accompanying drawings. The management device for a charging circuit includes a hardware circuit part and a software control part, wherein the hardware circuit part includes: a power supply management module, a buck switching voltage converter and a linear charging circuit;

wherein, as shown in FIG. 2, a conventional linear charging circuit includes a PNP charging tube, a sense resistor and a P type Metal-Oxide-Semiconductor (PMOS) control tube etc. The emitter of the PNP charging tube is the input terminal of the charging circuit and the voltage of the collector electrode is close to the voltage of the battery. When the difference between the charging voltage and the voltage of the battery is relatively large, the voltage drop on the PNP charging tube will be also relatively large, wherein the linear charging circuit as shown in FIG. 2 is only used as an example, but not intended to limit the protection scope of the present disclosure;

wherein the power supply management module includes an adjustable LDO linear regulator and an ADC, wherein a buck switching voltage converter is the core of the present disclosure. Using a high-efficiency buck switching voltage converter, the feedback terminal of the buck switching voltage converter is controlled by the output voltage of the adjustable LDO linear regulator in the power supply management module, thus realizing an adjustable output voltage. What needs to be explained is that a Qualcomm PM7540-type power supply management module is used as an example in this embodiment, but not intended to limit the protection scope of the present disclosure.

The output voltage of the adjustable LDO linear regulator of the power supply management module is set according to the voltage of the battery, thus forming a feedback control circuit. The output voltage of the buck switching voltage converter is adjusted in real time according to the voltage of the battery to charge the battery. The output voltage of the buck switching voltage converter which is automatically adjusted according to the voltage of the battery is usually about 0.3V higher than the voltage of the battery, and such output voltage can be taken as the input of the charging circuit. During constant-current charging, the sum of the voltage drop of the PMOS control tube and that of the sense resistor is about 0.1V and the maximum saturation voltage of the PNP charging tube can be 0.08V. Therefore, normal charging can be ensured by a voltage difference of only 0.3V between the input voltage of the charging circuit and the voltage of the battery, and then the voltage drop on the charging circuit is approximately 0.3V. In a conventional charging method, the charging voltage is constantly 5V, the voltage of a lithium battery is 3.7V and the voltage drop on a charging circuit is about 1.3V. According to the electrical characteristics of the lithium battery, the normal operating voltage is within a range of 3.3V~4.2V and the voltage drop on the PNP charging tube is within a dynamic range. What needs to be explained is that, the voltage different of 0.3V between the buck switching voltage converter and the charging circuit is only a preferred value, but not intended to limit the protection scope of the present disclosure.

Figure 3:
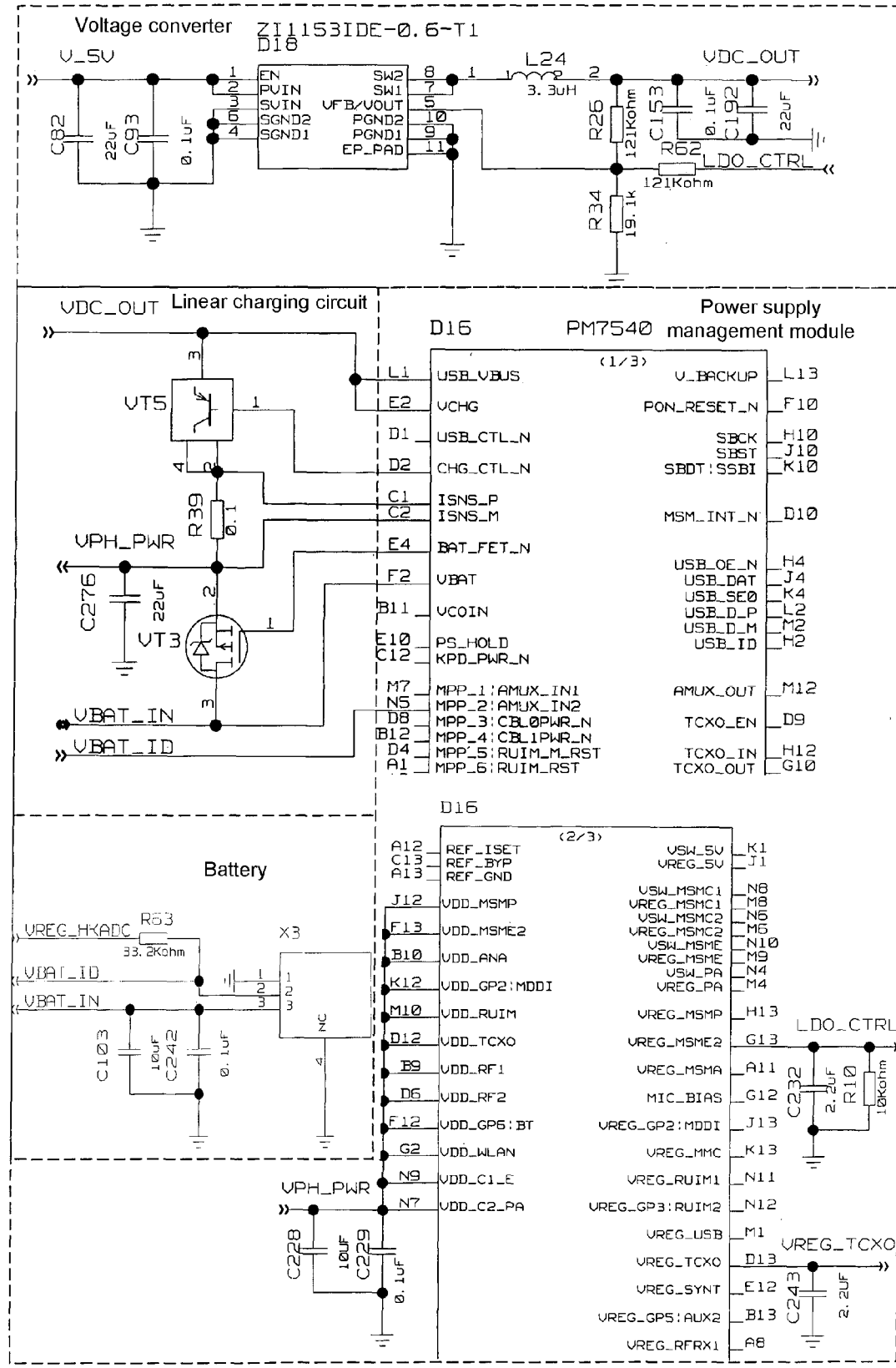
FIG. 3 is a diagram illustrating the circuit principle of automatically adjust a charging voltage provided by the present disclosure.

The buck switching voltage converter is the core of the present disclosure. As shown in FIG. 3, a voltage converter with an adjustable output voltage is improved on the basis of a conventional buck switching voltage converter with fixed output. The control of the feedback terminal is the core of the circuit and forms a control system capable of automatically adjusting the charging voltage according to the voltage of the battery. The feedback voltage is influenced by the adjustable LDO output voltage (VBAT_CTRL) in the power supply management module together with the dynamic output voltage (VDC_OUT). An appropriate feedback resistor can be selected to acquire an appropriate range of the output voltage of a buck switching voltage converter chip.

The working principle of the adjustable output voltage of a voltage converter is described hereinbelow in detail.

A voltage converter is based on a buck switching voltage converter with low cost and high efficiency, and description is given in this embodiment taking a Zi1153 buck switching voltage converter chip as an example. The chip is used in the following scenarios in the present disclosure: the input voltage is 5V±10%, the output voltage is 3.5~4.4V, the output current is about 700 mA, and it can be learned from the device information that the power efficiency is above 90%. The threshold voltage of the feedback terminal is 0.6V (Vfb), the feedback input bias current is smaller than 30 nA which is equivalent to a virtual open circuit, and the output voltage is determined by a divider resistor. It can be seen from FIG. 3 that besides a voltage divider formed by a resistor R26 and resistor R34, a resistor R62 is added to control the feedback terminal. The voltage of one terminal of the resistor R62 is output by an adjustable LDO regulator in the power supply management module, and the output voltage of the LDO regulator is set according to the voltage of the battery. Appropriate resistance values (with a precision of at least 1%) are selected for the three aforementioned resistors and the range of the output voltage of the buck switching voltage converter is able to meet the charging requirement.

As shown in FIG. 3, the resistance values of the resistor R26, resistor R34 and resistor R62 are 121K ohms, 19.1K ohms and 121 ohms, respectively. Since the input current of the feedback terminal of the buck switching voltage converter chip is smaller than 30 nA and the currents flowing through these three resistors are dozens of microamperes, the current flowing into the feedback terminal can be neglected. It can be learned from the Kirchhoff's Circuit Laws (KCL) that the relation between the output voltage (Vvdc_out) of the buck switching voltage converter and the output voltage (Vldo_ctrl) of the adjustable LDO regulator is:

$$(Vvdc\_out - Vfb)/VR26 + (Vldo\_ctrl - Vfb)/VR62 = Vfb/VR34 \quad (1)$$

wherein the Vfb is the voltage of the feedback terminal of the buck switching voltage converter, VR26 is the resistance value of the resistor R26, VR34 is the resistance value of the resistor R34, and VR62 is the resistance value of the resistor R62;

wherein resistor R62 is referred to as the first preset resistor, R34 is referred to as the second present resistor, and R26 is referred to as the third preset resistor. The values of these resistors are not limited to the aforementioned values, and the value of Vfb depends on the used buck switching voltage converter chip.

According to the relation formula (1), a simplified relation formula: Vvdc_out=5.0-Vldo_ctrl can be obtained by introducing the parameters selected in this embodiment. Therefore, Vvdc_out and Vldo_ctrl are in a monotonic decreasing relation. The output range of the adjustable LDO regulator is 0.75~1.5V, thus the output voltage of the buck switching voltage converter is determined accordingly. For example, if the output voltage of the adjustable LDO regulator is set as 1.5V, the output voltage of the buck switching voltage converter is 3.5V. If the output voltage of the adjustable LDO regulator is set as 0.75V, the output voltage of the buck switching voltage converter is 4.25V. The voltage of the battery is 3.2~3.95V, the battery can be set in a state of constant current charging, and the output voltage of the buck switching voltage converter is adjusted within 3.5~4.25V in this case. The voltage of the battery is 3.95~4.2V, the battery can be set in a state of constant voltage charging or pulse charging, the output of the adjustable LDO regulator in the charging state is turned off in this case, which means that the adjustable LDO regulator is disconnected from the feedback terminal of the buck switching voltage converter. At the moment, the output voltage of the buck switching voltage converter is only determined by R26 and R34 and the output voltage is: Vvdc_out=Vfb×(1+R26/R34)=0.6×(1+121K/19.1K)=4.4V. During the turning-on process, there is no output from the adjustable LDO regulator in the power supply management module, and the output voltage of the buck switching voltage converter is 4.4V, which satisfies the requirement of turning-on.

Figure 4:
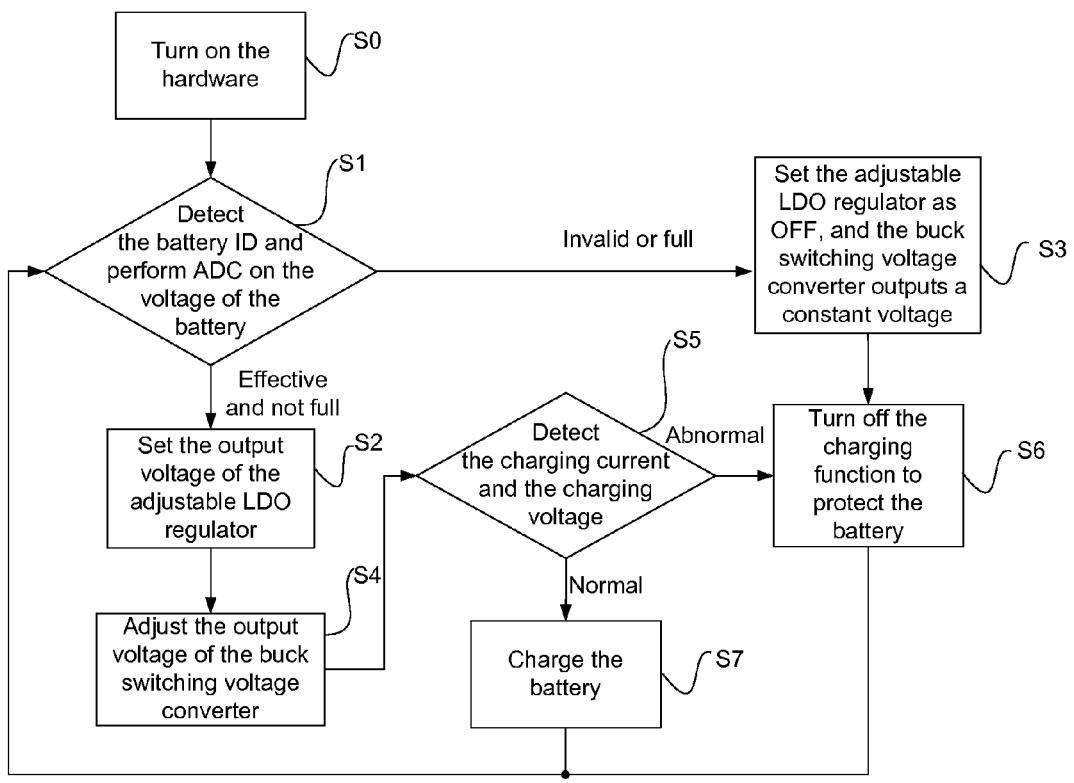
FIG. 4 is a flowchart illustrating the charging control provided by the present disclosure.

The adjustable output voltage of the buck switching voltage converter needs to be realized by software control, and the software control process is shown in FIG. 4. During the turning-on process (step S0) of the hardware, voltage has not been output by the adjustable LDO regulator in the power supply management module yet, and the output voltage of the buck switching voltage converter is 4.4V, which can supply power for the whole machine normally to turn on the machine. After the software is started, the ADC of the power supply management module detects the battery ID and samples the voltage of the battery (step S1). If the ID is valid and the battery power is not full, the output voltage of the adjustable LDO regulator is set according to the voltage of the battery (step S2), and change of the output voltage of the adjustable LDO regulator is fed back to the buck switching voltage converter to complete the automatic adjustment of the output voltage of the buck switching voltage converter (step S4). Subsequently, it is detected whether the charging current and the charging voltage are within an allowable range (step S5). If the charging current and the charging voltage are normal, the battery is charged normally (step S7), the voltage of the battery continues to increase, the output voltage of the adjustable LDO regulator is set to be decreased gradually, and the corresponding relation between the set output voltage of the adjustable LDO regulator and the output voltage of the buck switching voltage converter is shown in Table 1 to facilitate realization of programming.

TABLE 1

Corresponding relation between the DC-DC output voltage and the adjustable LDO set voltage

| Voltage of the battery (mV) | LDO output voltage (mV) | DC-DC output voltage (mV) |
|---|---|---|
| <=3200 | 1500 | 3500 |
| <=3250 | 1450 | 3550 |

TABLE 1-continued

Corresponding relation between the
DC-DC output voltage and the
adjustable LDO set voltage

| Voltage of the battery (mV) | LDO output voltage (mV) | DC-DC output voltage (mV) |
|---|---|---|
| <=3300 | 1400 | 3600 |
| <=3350 | 1350 | 3650 |
| <=3400 | 1300 | 3700 |
| <=3450 | 1250 | 3750 |
| <=3500 | 1200 | 3800 |
| <=3550 | 1150 | 3850 |
| <=3600 | 1100 | 3900 |
| <=3650 | 1050 | 3950 |
| <=3700 | 1000 | 4000 |
| <=3750 | 950 | 4050 |
| <=3800 | 900 | 4100 |
| <=3850 | 850 | 4150 |
| <=3900 | 800 | 4200 |
| <=3950 | 750 | 4250 |
| <=4200 | OFF | 4400 |

If the detected voltage of the battery reaches 4.2V (i.e. the battery is fully charged) or the battery ID is invalid, the output of the adjustable LDO regulator is turned off to ensure that the whole machine supplies power to the external equipment and does not consume the battery power, which is good for the battery life and safety. At the same time, the buck switching voltage converter outputs a constant voltage (step S3), and then charging is completed or terminated abnormally (step S6). During the whole charging control process, the voltage of the battery is variable, and the output of the adjustable LDO regulator changes accordingly, thus the output voltage of the buck switching voltage converter is automatically adjusted, so that the charging voltage is higher than the voltage of the battery and a certain difference is maintained, in this way, the charging requirement is satisfied while loss of the PNP charging tube is reduced, and the highest charging efficiency can be achieved in the whole charging system.

In the present disclosure, the efficiency of the buck switching voltage converter is higher than 90%, the output voltage of the buck switching voltage converter is taken as the input of the charging circuit and a typical value of the output voltage is 4.0V (battery voltage 3.7V+0.3V) and the efficiency of the charging circuit is 3.7V/4V=92.5%. The efficiency of the charging circuit of the present disclosure is obtained by combining the efficiencies of the circuits of these two parts: 90%×92.5%=83.25%. What needs to be explained is that, the efficiency here is a preferred value. The efficiency of a conventional linear charging circuit is close to the ratio of the voltage of the battery to the input voltage, which is a dynamic process, and a typical value of the efficiency may be 3.7V/5V=74%. Comparing the two efficiencies, it can be learned that the efficiency is increased by 83.25%−74%=9.75%. Since the battery capacity is constant, the increase in the charging efficiency inevitably causes the reducing of the input power, thus reducing the whole power.

It is required that the emerging MIFI products can work while being charged for a long time. Miniaturization of products present a challenge for the whole dissipated heat and the best method to solve the problem of heat dissipation of terminal products is to reduce the whole power consumption. The whole heat dissipation can be effectively reduced using the charging circuit of the present disclosure, along with another advantage: the operating current of an MIFI product is above 600 mA in the worst case, since the current output capability of the USB interface is 500 mA, thus, the current will be insufficient if a USB is used to supply power to a conventional charging circuit. The battery will discharge if the current supplied to the external equipment is insufficient, the output voltage of the buck switching voltage converter will decrease along with the resulting decrease in the voltage of the battery, and generally, an automatic turning-off will occur if the voltage of the battery is lower than 3.3V. As introduced above, normal work can be ensured only when the output voltage of the buck switching voltage converter is at least 3.6V. With the present disclosure, the maximum current output capability of the buck switching voltage converter is approximately 5V×500 mA×90%/3.6V=625 mA, which can greatly reduce the probability of current insufficiency.

Embodiment 2 of the present disclosure further provides a wireless terminal, including: a charging circuit management device. The charging circuit management device includes: a power supply management module, a buck switching voltage converter and a linear charging circuit. The power supply management module includes an adjustable LDO linear regulator and an ADC, wherein the output terminal of the adjustable LDO linear regulator of the power supply management module is connected with the feedback terminal of the buck switching voltage converter through a first preset resistor. The input terminal of the ADC of the power supply management module is connected with the anode of a battery. The control terminal of the power supply management module is connected with the control terminal of the linear charging circuit. The output terminal of the buck switching voltage converter is connected with the input terminal of the linear charging circuit. The output terminal of the linear charging circuit is connected with the anode of the battery.

When the battery is charged, the ADC of the power supply management module is configured to sample the battery power, and when determining that the battery is effective and that the battery power is not full, feed back the output voltage of the adjustable LDO linear regulator to the buck switching voltage converter according to the voltage of the battery. The buck switching voltage converter is configured to output a voltage to the linear charging circuit according to the feedback result. The linear charging circuit is configured to charge the battery under the control of the power supply management module.

Wherein, the relation between the output voltage Vvdc_out of the buck switching voltage converter and the output voltage Vldo_ctrl of the adjustable LDO linear regulator is:

(Vvdc_out−Vfb)/V3+(Vldo_ctrl−Vfb)/V1=Vfb/V2, wherein Vfb is the voltage of the feedback terminal of the buck switching voltage converter, V1 is the resistance value of the first preset resistor, V2 is the resistance value of a second preset resistor and V3 is the resistance value of a third preset resistor.

Wherein description of the charging circuit management device can referred to the corresponding description of embodiment 1, which will not be repeated here.

The present disclosure can realize automatic adjustment of the charging voltage by adding a buck switching voltage converter and utilizing an adjustable LDO linear regulator in a power supply management module, thus reducing the voltage drop on the charging tube (i.e. reducing the energy loss), the whole power loss is reduced to improve the whole heat dissipation well.

The foregoing description illustrates and describes a preferred embodiment of the present disclosure. However, as mentioned above, it should be understood that the present disclosure is not limited by the form as disclosed herein which cannot be viewed as exclusion to other embodiments, and the present disclosure can be used in various other combinations, modifications, and environments and can be changed within the scope of the inventive concept as expressed herein through the teachings above or skills or knowledge of the relevant art. Accordingly, modifications and changes made by those skilled in the art without departing from the sprit and scope of the present disclosure shall fall within the protection scope of the appended claims of the present disclosure.

The invention claimed is:

1. A management device for a charging circuit, comprising: a power supply management module, a buck switching voltage converter and a linear charging circuit;
   wherein, the power supply management module comprises an adjustable Low Dropout (LDO) linear regulator and an Analog-to-Digital Converter (ADC);
   wherein, an output terminal of the adjustable LDO linear regulator is connected with a feedback terminal of the buck switching voltage converter through a first preset resistor;
   wherein, an input terminal of the ADC is connected with an anode of a battery;
   wherein, a control terminal of the power supply management module is connected with a control terminal of the linear charging circuit;
   wherein, an output terminal of the buck switching voltage converter is connected with an input terminal of the linear charging circuit; and
   wherein, an output terminal of the linear charging circuit is connected with the anode of the battery.

2. The management device according to claim 1, wherein when the battery is charged, the ADC of the power supply management module is configured to sample battery power, and, when determining that the battery is effective and that the battery power is not full, feed back an output voltage of the adjustable LDO linear regulator to the buck switching voltage converter according to a voltage of the battery;
   wherein, the buck switching voltage converter is configured to output a voltage to the linear charging circuit according to the feedback result; and
   wherein, the linear charging circuit is configured to charge the battery under the control of the power supply management module.

3. The management device according to claim 1, wherein a relation between the output voltage Vvdc_out of the buck switching voltage converter and the output voltage Vldo_ctrl of the adjustable LDO linear regulator is:
   (Vvdc_out−Vfb)/V3+(Vldo_ctrl−Vfb)/V1=Vfb/V2,
      where Vfb is a voltage of the feedback terminal of the buck switching voltage converter, V1 is a resistance value of a first preset resistor, V2 is a resistance value of a second preset resistor, and V3 is a resistance value of a third preset resistor.

4. A wireless terminal, comprising a charging circuit management device, wherein, the charging circuit management device comprises a power supply management module, a buck switching voltage converter and a linear charging circuit;
   wherein, the power supply management module comprises an adjustable Low Dropout (LDO) linear regulator and an Analog-to-Digital Converter (ADC);
   wherein, an output terminal of the adjustable LDO linear regulator is connected with a feedback terminal of the buck switching voltage converter through a preset resistor;
   wherein, an input terminal of the ADC is connected with an anode of a battery;
   wherein, a control terminal of the power supply management module is connected with a control terminal of the linear charging circuit;
   wherein, an output terminal of the buck switching voltage converter is connected with an input terminal of the linear charging circuit; and
   wherein, an output terminal of the linear charging circuit is connected with the anode of the battery.

5. The wireless terminal according to claim 4, wherein when the battery is charged, the ADC of the power supply management module is configured to sample battery power, and, when determining that the battery is effective and that the battery power is not full, feed back an output voltage of the adjustable LDO linear regulator to the buck switching voltage converter according to a voltage of the battery;
   wherein, the buck switching voltage converter is configured to output a voltage to the linear charging circuit according to the feedback result; and
   wherein, the linear charging circuit is configured to charge the battery under the control of the power supply management module.

6. The wireless terminal according to claim 4, wherein a relation between the output voltage Vvdc_out of the buck switching voltage converter and the output voltage Vldo_ctrl of the adjustable LDO linear regulator is:
   (Vvdc_out−Vfb)/V3+(Vldo_ctrl−Vfb)/V1=Vfb/V2,
      where Vfb is a voltage of the feedback terminal of the buck switching voltage converter, V1 is a resistance value of a first preset resistor, V2 is a resistance value of a second preset resistor, and V3 is a resistance value of a third preset resistor.

* * * * *